United States Patent
Bikson

(10) Patent No.: US 11,980,846 B1
(45) Date of Patent: May 14, 2024

(54) SYSTEM AND METHOD FOR PRODUCING RENEWABLE NATURAL GAS FROM BIOGAS

(71) Applicant: Unconventional Gas Solutions, LLC, Houston, TX (US)

(72) Inventor: Benjamin Bikson, Newton, MA (US)

(73) Assignee: Unconventional Gas Solutions, LLC, Houston, TX (US)

( * ) Notice: Subject to any disclaimer, the term of this patent is extended or adjusted under 35 U.S.C. 154(b) by 0 days.

(21) Appl. No.: 18/235,472

(22) Filed: Aug. 18, 2023

(51) Int. Cl.
*B01D 53/22* (2006.01)
*B01D 53/00* (2006.01)
*B01D 53/04* (2006.01)
*B01D 53/047* (2006.01)
(Continued)

(52) U.S. Cl.
CPC ......... *B01D 53/229* (2013.01); *B01D 53/002* (2013.01); *B01D 53/047* (2013.01); *B01D 53/226* (2013.01); *B01D 53/84* (2013.01); *C10L 3/103* (2013.01); *C10L 3/104* (2013.01); *C10L 3/105* (2013.01); *B01D 2053/221* (2013.01); *B01D 2256/245* (2013.01); *B01D 2257/102* (2013.01); *B01D 2257/104* (2013.01); *B01D 2257/304* (2013.01); *B01D 2257/504* (2013.01); *B01D 2258/05* (2013.01);
(Continued)

(58) Field of Classification Search
CPC .... B01D 53/22; B01D 53/229; B01D 53/047; B01D 53/84; B01D 53/002; B01D 53/226; B01D 2256/245; B01D 2257/504; B01D 2257/104; B01D 2257/102; B01D 2257/304; B01D 2259/40086; B01D 2258/05; B01D 2053/221; B01D 2259/402; C10L 3/104; C10L 3/105; C10L 3/103; C10L 2290/548
See application file for complete search history.

(56) References Cited

U.S. PATENT DOCUMENTS 6,630,011 B1 * 10/2003 Baker .................. B01D 53/225
95/47
8,211,211 B1 * 7/2012 Knaebel ................ B01D 53/75
95/122
(Continued)

FOREIGN PATENT DOCUMENTS

EP 3240620 B1 5/2021

OTHER PUBLICATIONS

Aita, Bruno C. et al., "Biofiltration of H2S-rich biogas using Acidithiobacillus thiooxidans", Sep. 2015, Clean Techn Environ Policy DOI 10.1007/s10098-015-1043-5.
(Continued)

*Primary Examiner* — Youngsul Jeong
(74) *Attorney, Agent, or Firm* — FORGE IP, PLLC

(57) ABSTRACT

A system and method for generating renewable natural gas from raw biogas streams, such as biogas from landfills or biogas from controlled anaerobic digestion of biomass, provides for the efficient removal of acid gases and other impurities, including oxygen and nitrogen from biogas. The biogas is treated in a multi-stage membrane gas separation system integrated with a pressure swing adsorption system to generate pipeline-specification renewable natural gas. The combined system provides for efficient acid gas removal while simultaneously limiting oxygen carryover into the product stream.

54 Claims, 2 Drawing Sheets

(51) Int. Cl.
B01D 53/84 (2006.01)
C10L 3/10 (2006.01)

(52) U.S. Cl.
CPC .............. *B01D 2259/40086* (2013.01); *B01D 2259/402* (2013.01); *C10L 2290/548* (2013.01)

(56) References Cited

U.S. PATENT DOCUMENTS

| | | | | |
|---|---|---|---|---|
| 8,999,038 | B2 * | 4/2015 | Ungerank | B01D 53/226 95/47 |
| 11,219,856 | B2 | 1/2022 | Barraud et al. | |
| 11,504,668 | B2 | 11/2022 | Barraud et al. | |
| 2011/0305310 | A1 * | 12/2011 | Sanchez | B01D 53/227 95/55 |
| 2017/0283292 | A1 * | 10/2017 | Kim | B01D 53/226 |
| 2018/0250627 | A1 | 9/2018 | Zick et al. | |
| 2019/0224617 | A1 * | 7/2019 | Mitariten | B01D 53/0446 |
| 2022/0219978 | A1 * | 7/2022 | Tewari | F25J 3/0655 |

OTHER PUBLICATIONS

Anjan K. Datta et al., "Optimization of membrane unit for removing carbon dioxide from natural gas"; Journal of Membrane Science 283 (2006) 291-300.

Eric Dumont. "H2S removal from biogas using bioreactors: a review". International Journal of Energy and Environnement, 2015, 6 (5), pp. 479-498. hal-01945143.

Duran, at al., "Modeling a biogas upgrading PSA unit with a sustainable activated carbon derived from pine sawdust. Sensitivity analysis on the adsorption of CO2 and CH4 mixtures"; Chemical Engineering Journal 428 (2022) 132564.

Li, et al., "Biological technologies for the removal of sulfur containing compounds from waste streams: bioreactors and microbial characteristics"; World J Microbiol Biotechnol (2015), DOI 10.1007/s11274-015-1915-1.

A. Makaruk et al. "Membrane biogas upgrading processes for the production of natural gas substitute"; Separation and Purification Technology 74 (2010) pp. 83-92.

Malek, et al., "Study of a Six-Bed Pressure Swing Adsorption Process"; AIChE Journal (1997), vol. 43, No. 10, 2509-2523.

Eros Rosalbino Minardi et al., "Membrane applications for biogas production and puri?cation processes: an overview on a smart alternative for process intensification", RSC Adv.,2015,5,14156.

Santos, et al., "Pressure Swing Adsorption for Biogas Upgrading. Effect of Recycling Streams in Pressure Swing Adsorption Design"; Ind. Eng. Chem. Res. 2011, 50, 974-985.

* cited by examiner

SYSTEM AND METHOD FOR PRODUCING RENEWABLE NATURAL GAS FROM BIOGAS

FIELD OF THE INVENTION

This invention relates to a system and method for removing impurities from a range of biogas streams by combined membrane gas separation and pressure swing adsorption processes.

BACKGROUND OF THE INVENTION

Methane is one of the main components of the primary energy sources used in the world. Much of the raw methane-containing gas sources are "subquality," that is, the raw gas exceeds pipeline specifications in nitrogen, oxygen, carbon dioxide, and/or hydrogen sulfide concentration. The gas must be treated to meet pipeline specifications. Renewable natural gas (RNG) generated from biogas is an emerging alternative energy source comprised of methane.

Biogas is obtained by a complex degradation process of organic matter that is performed by a set of bacteria under mostly anaerobic conditions. The biogas can get contaminated with atmospheric air to some degree affecting gas composition. Biogas is produced from a variety of organic materials in plants ranging from sewage treatment plants to organic waste utilization in landfill sites to farm biogas production that utilizes ecologically pure crops and manure. The resulting gas consists primarily of methane and carbon dioxide together with smaller amounts of other gases and vapors, such as hydrogen sulfide, ammonia, volatile organic compounds (VOCs), oxygen, nitrogen, and additionally of siloxanes for landfill gas. As shown by a considerable number of biogas plants around the world, biogas production and utilization can result in additional available energy with reduced emission of methane and carbon dioxide to the atmosphere and the production of valuable fertilizer. Several biogas utilization methods can be applied. Presently, the most popular approach is the production of combined heat and power (CHP) by means of internal combustion engines. The CHP process can be deployed if heat consumers are in the vicinity of the plant. However, this requirement cannot be met in most cases. As a result, the excess heat energy is frequently vented into the atmosphere, lowering the overall energy production efficiency and requiring additional electrical power for heat removal. The biogas upgrading to pipeline natural gas quality avoids this shortcoming and generates renewable natural gas (RNG). The upgraded biogas is in the form of a natural gas substitute and can be injected into existent natural gas grids or used as a vehicle fuel using the natural gas infrastructure. The upgraded biogas can be distributed at a low cost and utilized with a higher efficiency by customers. However, to generate renewable natural gas, the raw biogas must be upgraded to pipeline specification by removing multiple impurities, where the largest volumetric component is carbon dioxide with other key impurities including hydrogen sulfide and oxygen.

The biogas contains a variable but high carbon dioxide content from 25 to 60 volumetric percent. The $H_2S$ concentration in the biogas usually ranges from 10 to 5,000 ppmv but can reach up to 30,000 ppmv (3% v/v) in some cases. In order to be used as a source of energy to generate heat and electricity or be used as renewable natural gas, biogas must be cleaned ($H_2S$ and siloxane removed) and upgraded ($CO_2$ removed to product specification). The raw biogas can further contain oxygen in variable amounts that can require removal to meet pipeline specification and a significant amount of nitrogen that may require removal as well to meet pipeline specification for the total inert component.

A large fraction of the raw biogas gas streams exceeds the typical acid gas pipeline specification for carbon dioxide of no more than 2% and for hydrogen sulfide below 4 ppm. Since the feed gas may contain other sulfur-based compounds and inert gas nitrogen, the pipeline natural gas typically must contain 0.5 grains of total sulfur or less per 100 cubic feet of gas with total non-hydrocarbons of 5% or less. Before biogas can be sent to the supply pipeline, the carbon dioxide and hydrogen sulfide content must be reduced. Various techniques for acid gas removal, including absorption into an amine solution, cryogenic separation, adsorption and membrane separation, have been used in the industry. Each has its own advantages and disadvantages. It is also known to use a combination of these unit separation processes for acid gas removal.

Methods heretofore known for the purification of biogas, in particular, carbon dioxide gas removal, may be divided roughly into the following classifications:

(a) Methods involving absorption separation unit operations, wherein water and, in particular, amine absorbent-based water solutions or physical solvents are utilized as an absorption media.

(b) Methods involving membrane separation unit operations, wherein the carbon dioxide is removed by preferential permeation through a polymeric membrane.

(c) Methods involving adsorption unit separation operations, wherein the carbon dioxide is removed by a thermal or pressure swing adsorption process. The most common adsorbent is activated carbon but other adsorbents, including zeolites, such as zeolite 5A, molecular sieve carbons, silica gel, activated alumina, or other adsorbents selective for carbon dioxide over methane are utilized as well.

(d) Methods involving liquefaction and cryogenic distillation are utilized when products in a liquified form are desired.

Membrane processes for biogas upgrading have been reviewed by A. Makaruk et al. in Separation and Purification Technology 74 (2010) pp. 83-92.

Membrane units remove carbon dioxide by selective permeation of $CO_2$ from high pressure to low pressure across a polymeric membrane. Membrane systems have numerous attractive features, such as intrinsic simplicity, the lack of cyclic valve switching, and the ability to generate dry biomethane at elevated pressure. Polymeric membranes can lose treating capacity over time due to exposure to contaminants, such as heavy hydrocarbons, and adsorption processes are commonly used as a pretreatment for the removal of water, heavy hydrocarbons, and other contaminants. The intrinsic simplicity of membrane gas separation processes made them attractive for biogas processing to produce renewable natural gas. However, the efficient removal of carbon dioxide from industrial process streams with a high methane product recovery by membrane processes requires staging. The membrane staging configuration must be optimized toward the specific application. Optimization of membrane units for removing carbon dioxide from natural gas is reviewed by Anjan K. Datta et al. in the Journal of Membrane Science 283 (2006) 291-300. A multistage membrane process for generating high-purity biomethane combined with high recovery from raw biogas is disclosed in U.S. Pat. No. 8,999,038. However, there is a disadvantage connected with a high flow of recycled permeated gas that leads to increases in compressor capacity and power consumption. To generate pipeline specification natural gas by a state-of-the-art multi-stage membrane system with a high 99.5% methane recovery, an increase of more than 50% in compressor capacity is required for the feed raw biogas compression.

Purification of biogas by adsorption processes has been used extensively. The bulk carbon dioxide removal is typically carried out by pressure swing adsorption (PSA) utilizing activated carbon. Combining a temperature swing adsorption (TSA) process with a PSA process provides for improved process economics. U.S. Pat. No. 4,770,676 describes a process combining a temperature swing adsorption (TSA) process with a PSA process for the recovery of methane from landfill gas. The TSA process removes water and minor impurities from the gas, which then goes to the PSA system, which is similar to U.S. Pat. No. 4,077,779, except that the external rinse step has been eliminated. $CO_2$ from the PSA section is heated and used to regenerate the TSA section. U.S. Pat. No. 4,857,083 claims an improvement over U.S. Pat. No. 4,077,779 by eliminating the external rinse step and using an internal rinse of secondary product gas ($CO_2$) during blow-down, and adding a vacuum for regeneration.

TSA and PSA hydrocarbon gas upgrading adsorption units are well-known in the art and can combine high product purity generation with high hydrocarbon recovery. However, they tend to be complex, and capital-intensive as compared to membrane systems and have the disadvantage of frequent cyclic valve switches and, therefore, are potentially less reliable due to valve failure. To generate a high-purity product at a high hydrocarbon recovery a multiple-bed adsorption system must be deployed, thereby increasing complexity and cost. A. Malek and S. Farooq, in the article entitled "Study of a Six-Bed Pressure Swing Adsorption Process", AIChE Journal, 1997 Vol. 43, No. 10, p. 2509, review muti-bed process optimization. The purification of biogas by the PSA process is described in numerous publications. For example, Ines Duran et al., "Modeling a biogas upgrading PSA unit with a sustainable activated carbon derived from pine sawdust. Sensitivity analysis on the adsorption of $CO_2$ and $CH_4$ mixtures", Chemical Engineering Journal 428 (2022) 132564 and by Monica P. S. Santos et al., "Pressure Swing Adsorption for Biogas Upgrading. Effect of Recycling Streams in Pressure Swing Adsorption", Ind. Eng. Chem. Res. 2011, 50, 974-985. A multi-stage, multi-bed PSA adsorption system to generate RNG from raw biogas is disclosed in the International Patent Application WO 2019/239381 by Da Silva Barcia et al. titled "Multi-Stage PSA Process to Remove Contaminant Gases from Raw Methane Streams". The raw biogas stream containing carbon dioxide, nitrogen, and oxygen is treated in the first PSA stage, using selective adsorbents to remove oxygen and nitrogen. The biogas stream depleted of nitrogen and oxygen is treated in the second PSA stage. The second stage employs an adsorbent to selectively remove carbon dioxide and trace amounts of remaining nitrogen and oxygen, thus producing a purer methane stream that meets pipeline gas specifications. However, the first stage PSA reject stream contains a significant amount of $CH_4$ in addition to $O_2$ and $N_2$ that decrease overall $CH_4$ recovery.

Activated carbon adsorbents are effective in $H_2S$ removal, including impregnated carbon adsorbents. Impregnation can be based on alkaline substances that do not require supplemental oxygen for $H_2S$ removal. The carbon adsorbent may be impregnated by a catalyst that requires oxygen presence for $H_2S$ removal in normal operations. Biogas feed streams frequently contain oxygen. In the presence of oxygen, $H_2S$ is oxidized and deposited in the form of sulfur on the activated carbon. Depending on the fermentation processes, the biogas produced may be too low in oxygen (<0.02% mol) to allow the chemical reaction on the impregnated activated carbons to transform the $H_2S$ into elemental sulfur (S) deposited within the pores of the carbons. In this case, the loading rate of the activated carbons (quantity of adsorbed $H_2S$ relative to the mass of carbon active) is greatly reduced and the life of the activated carbon charge is also reduced. Consequently, the renewal of activated carbons is more frequent and entails additional operating costs. It has been proposed in French Patent Application FR3019061A1 to inject air or oxygen into the biogas to increase oxygen concentration and improve $H_2S$ removal efficiency by activated carbon. However, excessive amounts of oxygen or nitrogen may accumulate in the biogas and necessitate downstream removal to meet pipeline specifications.

F. Winkler, in U.S. Patent Application Publication No. US 2021/0339189 A1, discloses a biogas treatment system comprised of an activated carbon $H_2S$ removal adsorbent bed in front of a three-stage membrane system. The oxygen content and relative humidity can be adjusted for the optimum adsorption capacity of the hydrogen sulfide adsorber by recycling permeate from the second membrane separation stage, which receives the retentate of the first membrane separation stage, to a point upstream of the hydrogen sulfide adsorber.

Currently, most of the adsorption-based techniques employed in the removal of $H_2S$ from biogas have a chemical base, with high material costs and secondary pollutant generation that restricts their applications for biogas treatment with significant $H_2S$ content. Biological processes for $H_2S$ removal have become effective and economical alternative techniques to traditional gas-treatment systems based on physicochemical methods. The biological processes of $H_2S$ removal are reviewed in the following publications: E. Dumont, "$H_2S$ removal from biogas using bioreactors: a review", International Journal of Energy and Environment, Volume 6, Issue 5, 2015, pp. 479-498; Bruno Carlesso Aita et al., "Biofiltration of $H_2S$-rich biogas using *Acidithiobacillus thiooxidans*", Clean Technology Environmental Policy, 18 (3) 689, DOI 10.1007/s10098-015-1043-5; Lin Li et al., "Biological technologies for the removal of sulfur containing compounds from waste streams: bioreactors and microbial characteristics", World Journal Microbiology Biotechnology, 31 (10) 1501.

Biological desulfurization technologies are well established and their use for biogas treatment can be generically divided into segments that differ in methods of oxygen introduction and utilization in the bioprocess. Oxygen is the prerequisite to enable $H_2S$ oxidation and removal and proceeds according to the following mechanisms

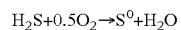
$$H_2S + 0.5O_2 \rightarrow S^0 + H_2O$$

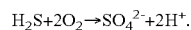
$$H_2S + 2O_2 \rightarrow SO_4^{2-} + 2H^+.$$

The process proceeds with $H_2S$ oxidation to elemental sulfur and/or sulfuric acid. The oxygen supply and process conditions determine the balance between sulfur and sulfuric acid formation.

The raw biogas produced by anaerobic digestion contains some oxygen in a variable concentration. To enable efficient $H_2S$ removal by a biological process the oxygen concentration must be managed. A low oxygen concentration can lead to incomplete $H_2S$ removal and even affect the viability of the $H_2S$-reducing bacteria. However, oxygen excess is undesirable since it will accumulate in the product RNG. RNG product specification can vary but pipeline specifications typically have stringent limits on the residual oxygen content. Excess oxygen is commonly removed by the deoxygenation process wherein the oxygen is reacted with methane at high temperatures and converted into water vapor and $CO_2$. The process consumes product methane and necessitates an additional dehydration step to remove water.

M. J. Mitariten, in U.S. Pat. No. 8,221,524 B2, discloses a combined membrane adsorption process wherein the bulk of the carbon dioxide and some of the oxygen are removed from the feed gas by a membrane process followed by a PSA process to remove residual oxygen. The use of a membrane process to remove oxygen from biogas is further described in U.S. Patent Application Publication No. US 2023/0114525 A1. The process is applicable to biogas streams with limited oxygen content only and the low oxygen removal efficiency leads to a significant methane product loss.

The clogging of the biological treatment system due to the deposit of elemental sulfur $S_0$ and biomass accumulation represents the most common problem in bioprocesses treatment operation and is frequently the result of oxygen imbalance. Injection of supplemental oxygen is frequently required to manage bioprocesses treatment operations. This, in turn, increases oxygen content in the treated gas and necessitates downstream oxygen removal to meet pipeline specifications.

It is known to utilize membranes with tailored $H_2S$ removal characteristics in biogas treatment. Y. Ding and M. Mitariten, in U.S. Patent Application Publication No. US 2020/0179868 A1, disclose a biogas treatment process that removes carbon dioxide and hydrogen sulfide from the biogas to generate pipeline specification RNG. Multiple types of membranes with properties tailored to hydrogen sulfide and carbon dioxide removal are utilized to remove acid gases. However, low membrane selectivity limits the range of biogas streams that can be treated to meet pipeline specifications and the hydrogen sulfide removed by membrane processes must be sent to flair leading to significant SOx emissions.

K. A. Lokhandwala et al., in U.S. Pat. No. 5,401,300, titled "Sour Gas Treatment Process Including Dehydration of the Gas Stream" disclose a membrane-based process for hydrogen sulfide removal combined with gas dehydration. However, low membrane selectivity limits the range of biogas streams that can be treated to meet pipeline specifications and the hydrogen sulfide removed by membrane processes must be sent to flair leading to significant SOx emissions.

M. J. Mitariten, in U.S. Patent Application Publication No. US 2012/0264197 A1, "$H_2S$ Removal from Contaminated Gases" discloses a process for removing hydrogen sulfide from a raw natural (US) gas stream such as biogas from landfills or controlled anaerobic digestion. The process comprises passing the natural gas stream through a separation unit, such as a PSA unit, to form a product stream that consists of a high concentration of methane and a low-pressure tail gas containing hydrogen sulfide, passing the tail gas through a biofilter which includes bacteria that degrades the hydrogen sulfide to sulfur and sulfate compounds which are washed from the biofilter. The tail gas stream subsequent to the treatment in the biofilter can be flared into the atmosphere without significant SOx emissions.

Within the current state of the art, membrane systems offer low energy consumption, significantly lower investment costs, and ease of operation. Low selectivity, however, makes problematic the production of high-purity gases at high recovery necessitating membrane staging.

State-of-the-art membrane systems are efficient in bulk acid gas removal but are characterized by high electrical power consumption related to recycled gas recompression to attain high product purity with high recovery. Removal of $H_2S$ by adsorption processes prior to the gas being treated by membrane processes is the most common. In an alternative approach, wherein hydrogen sulfide is removed by membrane processes, the $H_2S$-containing gas stream must be sent to an additional treatment to avoid $H_2S$ emissions. The oxygen and nitrogen removal by membrane processes leads to high methane product losses. The pipeline specification of the permissible oxygen content in the biomethane is being progressively tightened and thus an energy-efficient solution for oxygen removal is required. The commercially available membrane systems cannot meet the pipeline specifications for oxygen content without extensive post-purification steps. Thus, there is still a need for an improved energy-efficient and lower-cost combined acid gas and oxygen removal process from the biogas that overcomes the limitations of the prior art.

SUMMARY OF THE INVENTION

The present invention provides an integrated process and apparatus for the purification of raw biogas that combines a membrane separation system for the removal of acid gases with a pressure swing adsorption system that removes oxygen and some nitrogen from a recycle stream of the membrane separation system. The process of the invention and the apparatus of the invention provide for a novel integration of the pressure swing adsorption process with at least one recycle stream generated by the multi-stage membrane system. The invention allows to produce RNG from a broad range of raw biogas streams, including landfill gas and digester gas. A substantial fraction of carbon dioxide and oxygen are removed by a combination of a multistage membrane system and pressure swing adsorption. The individual separation unit operations of the integrated process and their combination are optimized to increase hydrocarbon recovery while removing the bulk of acid gas content and oxygen. By combining these two purification systems, it is possible to remove multiple contaminants at significantly lower operating costs. Thus, it is an objective of the present invention to combine a membrane separation system with a pressure swing adsorption system to remove the carbon dioxide and oxygen from the raw biogas simultaneously. The reject stream enriched in oxygen content removed from the treated biogas stream by the apparatus of the invention can be directed to the biological biogas pretreatment system and is used for beneficial $H_2S$ removal. Alternatively, the caloric value of the reject stream enriched in oxygen content removed from the treated biogas stream by the apparatus of the invention can be adjusted and the reject stream used for heat and power generation.

In one embodiment of the invention, the process for the purification of raw biogas stream containing methane, acid gases, oxygen, and nitrogen available at substantially atmospheric pressure comprises the steps of:
  (i) compressing a feed gas stream comprising said raw biogas stream in a compressor to a pressure from 6 to 25 barg followed by aftercooling and condensate separation, thereby forming a first effluent stream;
  (ii) passing the first effluent stream into a first membrane separation unit, wherein a membrane removes a portion of carbon dioxide, oxygen and nitrogen from the first effluent stream, thereby forming a retentate second effluent stream having a lower carbon dioxide content and a lower oxygen content than the first effluent stream and a permeate third effluent stream enriched in carbon dioxide and oxygen as compared to the first effluent stream;

(iii) passing the second effluent stream to a second membrane separation unit, wherein a membrane removes a portion of carbon dioxide from the second effluent stream, thereby forming a retentate fourth effluent stream having a lower carbon dioxide and oxygen content than the second effluent stream and a permeate fifth effluent stream enriched in carbon dioxide and oxygen content as compared to the second effluent stream;

(iv) passing the third effluent stream to a third membrane separation unit wherein a membrane removes a portion of carbon dioxide from the third effluent stream, thereby forming a retentate sixth effluent stream having a lower carbon dioxide content than the third effluent stream and a higher oxygen and nitrogen content than the third effluent stream and a permeate seventh effluent stream enriched in carbon dioxide content and depleted in oxygen, nitrogen and methane content as compared to the third effluent stream, wherein the seventh effluent stream is at substantially atmospheric pressure or at a sub-atmospheric pressure;

(v) passing the sixth effluent stream to a pressure swing adsorption separation unit containing an adsorbent selective for removal of oxygen and nitrogen from a mixture of methane and carbon dioxide, wherein the pressure swing adsorption separation unit generates an eighth effluent stream depleted in nitrogen and oxygen content as compared to the sixth effluent stream, and a blow-off gas ninth effluent stream comprised substantially of nitrogen and oxygen, wherein the eighth effluent stream is at an intake pressure of said compressor and the ninth effluent stream is at a pressure above atmospheric pressure;

(vi) passing the eighth effluent stream containing recoverable methane to an intake side of said compressor, wherein the eighth effluent stream is mixed with the raw biogas stream to define the feed gas stream;

(vii) passing the fifth effluent stream containing recoverable methane to the intake side of said compressor, wherein the fifth effluent stream is mixed with the raw biogas stream to define the feed gas stream; and (viii) collecting the fourth effluent stream generated by the second membrane separation unit as a methane product.

In another embodiment of the invention, a process for the purification of a raw biogas stream containing methane, carbon dioxide, hydrogen sulfide, oxygen, and nitrogen available at substantially atmospheric pressure comprises the steps of:

(i) compressing a feed gas stream comprising said raw biogas stream in a compressor to a pressure from 6 to 25 barg followed by aftercooling and condensate separation, thereby forming a first effluent stream;

(ii) passing the first effluent stream into a first membrane separation unit, wherein a membrane removes a portion of carbon dioxide and oxygen from the first effluent stream, thereby forming a second retentate effluent stream having a lower carbon dioxide content and a lower oxygen content than the first effluent stream and a permeate third effluent stream enriched in carbon dioxide and oxygen as compared to the first effluent stream;

(iii) passing the second effluent stream to a second membrane separation unit, wherein a membrane removes a portion of carbon dioxide from the second effluent stream, thereby forming a retentate fourth effluent stream having a lower carbon dioxide content than the second effluent stream and a permeate fifth effluent stream enriched in carbon dioxide as compared to the second effluent stream;

(iv) passing the third effluent stream to a third membrane separation unit wherein a membrane removes a portion of acid gas from the third effluent stream, thereby forming a retentate sixth effluent stream having a lower acid gas content than the third effluent stream and higher oxygen content than the third effluent stream and a permeate seventh effluent stream enriched in acid gas content and depleted in oxygen content as compared to the third effluent stream, wherein the seventh effluent stream is at substantially atmospheric pressure or at a sub-atmospheric pressure;

(v) passing the sixth effluent stream to a pressure swing adsorption separation unit containing an adsorbent selective for removal of acid gas and methane from oxygen and nitrogen, wherein the pressure swing adsorption separation unit generates an eighth effluent stream depleted in oxygen and nitrogen as compared to the sixth effluent stream, a blow-off gas ninth effluent stream comprised substantially of oxygen and nitrogen, and a tenth effluent stream comprised primarily of carbon dioxide, wherein the eighth effluent stream is at substantially atmospheric pressure, the tenth effluent stream is at a sub-atmospheric pressure and the ninth effluent stream is at above atmospheric pressure;

(vi) passing the eighth effluent stream containing recoverable methane to an intake side of said compressor, wherein the eighth effluent stream is mixed with the raw biogas stream to define the feed gas stream;

(vii) passing the fifth effluent stream containing recoverable methane to the intake side of said compressor, wherein the fifth effluent stream is mixed with the raw biogas stream to define the feed gas stream; and (viii) collecting the fourth effluent stream generated by the second membrane separation unit as a methane product.

The multi-stage membrane system removes carbon dioxide from the raw biogas stream to meet pipeline specifications. However, the removal of oxygen and nitrogen by the membrane system is limited. The raw biogas can contain variable concentrations of oxygen and nitrogen. The oxygen concentration can be as high as 4% and must be removed to meet the pipeline product specification. A pressure swing adsorption system integrated into at least one of the recycle streams, i.e., the retentate effluent stream generated by the third membrane unit or the permeate effluent stream generated by the second membrane unit, provides for the efficient removal of oxygen and supplemental removal of nitrogen.

It is preferable to integrate the adsorption PSA unit in the sixth retentate recycle stream generated by the third membrane unit. However, it is within the scope of the invention to combine both the sixth and the fifth recycle streams and treat the combined stream in the PSA adsorption unit. The pressure of the fifth permeate effluent stream from the second membrane unit is collected at atmospheric pressure and is boosted prior to being combined with the retentate effluent stream from the third membrane unit, with the combined stream being directed to the PSA adsorption unit. Alternatively, the fifth permeate effluent stream from the second membrane unit is collected at a pressure equal to the retentate effluent stream pressure from the third membrane unit, with the combined stream being directed to the PSA adsorption unit.

The above and other features of the invention, including various novel details of construction and combinations of parts, and other advantages, will now be more particularly described with reference to the accompanying figures and pointed out in the claims. It will be understood that the particular method and apparatus embodying the invention are shown by way of illustration and not as a limitation of the invention. The principles and features of this invention may be employed in various and numerous embodiments without departing from the scope of the invention.

DETAILED DESCRIPTION OF THE PREFERRED EMBODIMENTS

Figure 1:
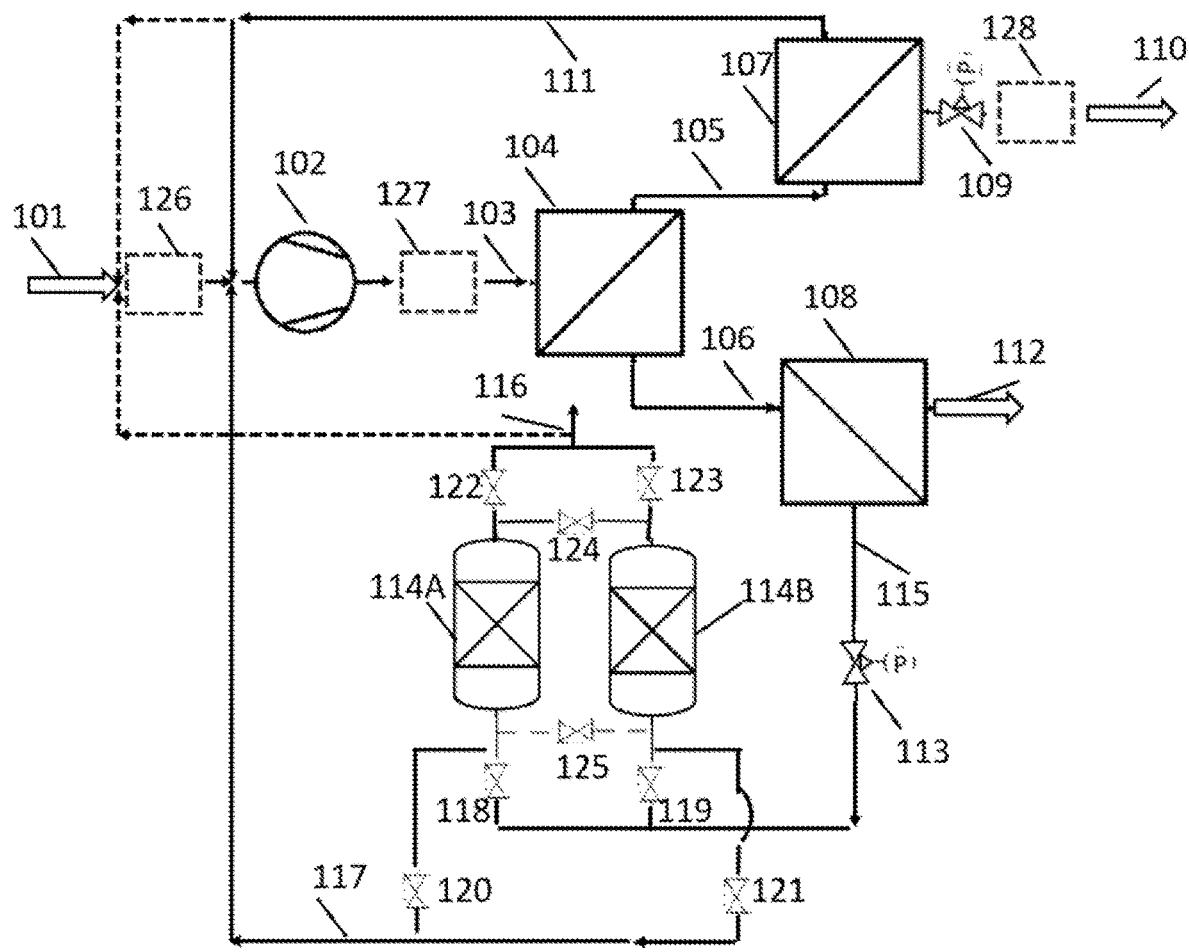
FIG. 1 is a schematic drawing of one exemplary embodiment of a process according to the invention wherein a low-pressure biogas gas containing acid gases $CO_2$ and $H_2S$, oxygen, and nitrogen is treated in a system comprised of a compressor, a multistage membrane system and a pressure swing adsorption unit. The multistage membrane system features two recycle streams designed to increase methane recovery. The pressure swing adsorption unit is positioned to treat one of the recycle streams to remove oxygen and nitrogen from the recirculation loop. The hydrogen sulfide is removed prior to the high pressure gas entering the first membrane separation unit.

The present invention provides an improved process and apparatus for producing a renewable methane stream with reduced acid gas and oxygen content from raw biogas that meets pipeline specifications. The carbon dioxide and other impurities, including oxygen and nitrogen, are removed by a combination of a multi-stage membrane separation system integrated with a pressure swing adsorption system (PSA). The three-stage membrane system provides for the simultaneous removal of carbon dioxide and oxygen from raw biogas. The three-stage membrane system features two recycle streams designed to increase methane recovery. The pressure swing adsorption system consists of two to four adsorption beds and is positioned to treat at least one of the recycle streams to remove oxygen and nitrogen from the recirculation loop.

The carbon dioxide concentration of the biogas varies from above 25% to as high as 60%, more commonly from 30% to 55%. The carbon dioxide must be removed and the caloric value of the product gas increased prior to gas utilization for direct heat and power generation or for injecting the RNG product into the distribution grid. The raw biogas available at a substantially atmospheric pressure is compressed and treated in a three-stage carbon dioxide and oxygen removal system. The carbon dioxide concentration must be removed to meet the local pipeline specification, which can vary from 5% to 2% mol or even lower if the feed gas contains a significant amount of inert gas components, such as nitrogen.

Raw biogas refers to a gas mixture of two or more gases generated by an anaerobic digestion process which is to be separated using the process of the present invention. Feed gas stream refers to a process stream that is supplied to the intake of the compressor. The feed gas stream corresponds to the raw biogas stream combined with recycle streams from the membrane separation system and the adsorption separation system, wherein the raw biogas stream is directed to the compressor intake port. In some embodiments, the raw biogas underwent preliminary purification to remove certain impurities, such as ammonia and hydrogen sulfide, prior to admixture into the feed gas. The raw biogas may be available at atmospheric pressure or can come from a source that is already at a pressure above atmospheric pressure. The raw biogas that underwent preliminary purification can be also available at above atmospheric pressure. However, the feed gas stream will require pressurization before being processed by the process of the invention. The raw biogas or the feed gas stream is specified as available at substantially atmospheric pressure to indicate the need to compress the gas prior to processing to remove undesirable impurities by the process of the invention.

In most cases, the separation system elements of the apparatus of the present invention are configured such that a compressor, upstream of the first membrane stream separation stage, is used to generate the driving force for all process separation stages. In some embodiments, at least one vacuum device in at least one of the membranes' permeate streams, and a vacuum device in an adsorption and regeneration step, are used to generate an additional driving force. The additional driving force in some embodiments is provided by interstage booster or compressor.

The membrane separation units or stages are comprised of one or more membrane modules equipped with polymeric membranes. The membranes are preferably in a hollow fiber configuration. The hollow fiber membrane modules can be configured with shell side feed or bore side feed with bore side feed being preferred. Membrane permeance is defined as material flow per unit of time, unit of membrane area, and differential pressure through a membrane. The term membrane selectivity as used and claimed in the present invention to characterize membranes, in each case is the pure gas selectivity, independent of whether membranes are used to separate a two-component or a multi-component gas mixture. The selectivity for hollow fiber membranes is calculated as a quotient of the permeances of two pure gases and is an indication of how well the membrane can separate a gas mixture with regard to the two components.

Membrane permeate refers to the gas stream obtained on the low-pressure side of the membrane, membrane module, or membrane separation step. Permeate gas refers in each case to gas generated by permeation through a polymeric membrane with gas component(s) enriched in the permeate stream relative to the respective feed stream at the membrane, at the membrane module, or in the membrane separation step. Retentate refers to the entire stream that is obtained on the high-pressure side of the membrane, membrane modules, or membrane separation step that does not pass through the membrane. Retentate gas refers to the component(s) enriched in each case in the retentate stream relative to the respective feed stream at the membrane, at the membrane module, or in the membrane separation step.

The raw feed biogas that is available at substantially atmospheric pressure is compressed prior to being treated by the process of the invention with the product methane gas directed into a pipeline or otherwise utilized. The feed gas is compressed to a pressure between 6 and 25 barg, preferably between 10 and 16 barg. The compressed feed biogas is treated in the first membrane unit wherein the carbon dioxide and oxygen are removed by permeation. The retentate non-permeate gas generated by the first membrane unit may still contain an excess of carbon dioxide and thus is treated in an additional second membrane separation unit. The retentate from the second separation unit constitutes the RNG product. The permeate gas from the second membrane unit contains a significant amount of recoverable methane. Thus, this permeate stream is recycled to the front end of the compressor and combined with the raw biogas to increase methane recovery.

The permeate gas generated by the first membrane unit is treated in a third membrane separation unit that removes additional carbon dioxide by permeation to generate a permeate gas stream with carbon dioxide concentration above 90 mole percent, preferably above 95 mole percent, most preferably above 98 mole percent. The retentate gas generated by the third membrane unit contains recoverable methane. It is thus desirable to recycle this stream to the front end of the compressor. However, this stream, in addition to methane, contains oxygen and some nitrogen. The direct recycling of this stream will reintroduce oxygen and nitrogen back into the feed gas stream and lead to an increase of the nitrogen and oxygen content in the circulation loop.

It was discovered as part of the instant invention that the retentate stream from the third membrane unit can be treated in an adsorption system to remove oxygen and some nitrogen from this stream prior to recycling. The membrane process is designed such as to collect permeate gas from the first membrane stage at an elevated pressure between atmospheric and 6 barg. The permeate gas pressure generated by the first membrane unit can be boosted via the use of a booster or a compressor prior to directing the gas into the third membrane unit. In one embodiment, the permeate gas pressure is maintained at 3 barg prior to the gas being directed into the third membrane unit. In another embodiment, the permeate gas is maintained at 3 barg and is boosted to 10 barg by an interstage booster. It is within the scope of the invention to maintain the permeate gas pressure below 3 barg and boost the gas pressure by a 2 to 6 barg increment before the gas is directed into the third membrane unit. Thus, the retentate gas generated by the third membrane system is available at a pressure between 2 and 10 barg to enable the PSA system operation.

Some biogas gas may contain a significant concentration of inert impurities, such as nitrogen, in addition to oxygen. The RNG product gas carbon dioxide concentration may need to be reduced further to meet the pipeline's total inert gas concentration limit. The excess nitrogen is removed by the pressure swing adsorption (PSA) system together with oxygen.

The raw biogas stream can contain a significant amount of hydrogen sulfide and other sulfur-containing impurities that must be removed to meet customer product specifications. The hydrogen sulfide concentration can be as low as 10 ppm or as high as 3% and above for some biogas streams. To meet the pipeline gas specification the concentration of impurities must be reduced to a typical pipeline specification of hydrogen sulfide: 0.25-0.3 g/100 scf (6-7 mg/m$^3$); total sulfur: 5-20 g/100 scf (115-460 mg/m$^3$); water vapor: 4.0-7.0 lb/MM scf (60-110 mg/m$^3$), and oxygen: 1.0% or less with total non-hydrocarbons content of 5% or less.

The hydrogen sulfide is removed by an adsorption system prior to or following biogas compression. The adsorption unit can be equipped with activated carbon and impregnated activated carbon materials utilized for H$_2$S removal well known in the art. The operation of the adsorption unit can be integrated with the membrane system and the PSA system operations. In one embodiment of the invention, the adsorption hydrogen sulfide removal unit is positioned before the compressor gas intake port and the permeate gas stream generated by the second membrane separation unit is recycled to the front end of the adsorption unit and is mixed with the raw biogas. The gas treated by the adsorption unit is further mixed with the recycle stream from the adsorption unit to form the feed gas stream.

In another embodiment of the invention, the adsorption H$_2$S removal unit is positioned to treat the effluent stream following the feed gas compression. The raw feed gas that underwent compression followed by aftercooling and condensate removal is directed into the adsorption H$_2$S removal unit. The adsorption unit provides a further benefit by removing additional contaminants, such as VOC vapors. In some embodiments, the adsorption unit can be regenerated utilizing the dry blow-off gas from the PSA adsorption unit. It is also known to remove hydrogen sulfide by a membrane selective to hydrogen sulfide as compared to methane. Such membrane H$_2$S removal unit can be positioned following biogas compression with the permeate gas sent to flair.

It is also within the scope of the invention to remove hydrogen sulfide by a biological process prior to compression. Biological processes for H$_2$S removal have become effective and economical alternative techniques to traditional gas-treatment systems based on physicochemical techniques. Biological hydrogen sulfide removal is an efficient method of biogas treatment. It is largely known that the most appropriate bacterial species for biogas purification are the chemoautotrophic bacteria. Several chemoautotrophic bacteria are suitable for the biodegradation of H$_2$S. These bacteria grow and produce a new cellular material using inorganic carbon (CO$_2$) as a source of carbon and obtain chemical energy from the oxidation of inorganic compounds, such as H$_2$S. Among the chemoautotrophic bacteria, the sulfur-oxidizing bacteria such as *Thiobacillus, Acidithiobacillus, Achromatium, Beggiatoa, Thiothrix, Thioplaca, Thiomicrospira, Thiosphaera, Thermothrix*, and others are utilized. Bacteria of the genus *Thiobacillus* or *Acidithiobacillus* are the most suitable for the treatment of gases containing H$_2$S because they require fewer nutrients and have optimum activity in the acidic pH. The main characteristics that the bacteria should have are the ability to convert H$_2$S to sulfur, S$_0$ and sulfuric acid; low nutrient requirement; easiness in the separation of S$_0$ from biomass; low biomass accumulation; and high resistance to fluctuations in pH, temperature, moisture, polluting load, and O$_2$ demand.

Oxygen is the critical enabling component in hydrogen sulfide oxidation and removal by biological processes. Oxygen is the prerequisite to enable H₂S oxidation and removal and proceeds according to the following mechanisms:

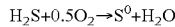

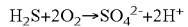

The process proceeds with H₂S oxidation to elemental sulfur and/or sulfuric acid. The oxygen supply and process conditions determine the balance between sulfur and sulfuric acid formation. However, the raw biogas frequently contains insufficient oxygen content and supplemental oxygen injection is required. The excess oxygen then must be removed in the subsequent purification step. The process of the instant invention provides for improved management of oxygen in the biological desulfurization process by removing excess oxygen from the biogas stream. The blow-off gas generated by the PSA system in the process of adsorbent regeneration contains oxygen removed from the biogas. This process stream can be fully or partially directed into the biological desulfurization system to manage oxygen demand as required, eliminating supplemental oxygen injection. Alternatively blow-off gas generated by the adsorption unit can be directed to the inlet of the supplementary oxygen generator to enrich inlet air with oxygen, thus increasing oxygen production efficiency.

Raw biogas is commonly available at substantially atmospheric pressure. The pressure of the raw biogas may be increased by way of a gas blower prior to being fed into the biological treatment unit, but typically will not exceed 0.5 barg. Certain gas impurities can be removed prior to the biological treatment. In one example, ammonia present in the biogas is removed by way of a water wash prior to the biogas being treated in the biological hydrogen sulfide removal unit with recycling of acidic effluents produced in the biological reactor for intensification of the ammonia washing step.

The raw feed gas can further contain a number of impurities in variable concentrations that must be removed prior to the gas being treated by membrane units following compression. For biogas, these impurities may include siloxanes and volatile organic hydrocarbons, among others. These impurities are removed by methods well-known in the art and can include adsorption by activated carbon. It is within the scope of the invention to remove some impurities prior to compression while removing the rest of the impurities following compression.

The use of polymeric membranes to purify biogas is known in the art. The membranes are in the hollow fiber configuration and are fabricated from engineering polymers including polyimides and polysulfones. The polyimides disclosed in U.S. Pat. No. 5,591,250 and WTO International Publication Number WO 2011/009919 A1 are particularly preferred. The membrane separation units are comprised of one or more membrane separation modules equipped with polymeric gas separation membranes with modules arranged in series or in parallel. The hollow fiber membranes are packaged into modules with the bore side feed gas configuration most common in biogas treatment. The modules preferably operate in the counter-current flow mode between the feed and permeate gas streams to increase thermodynamic separation efficiency and reduce methane gas loss. Each module has polymeric membranes with a defined high-pressure side and low-pressure side, and each module has an inlet port connected to the high-pressure side, a retentate outlet port, and a permeate outlet port, therein the retentate outlet port providing an outlet for gas on the high-pressure side, and the permeate outlet port providing an outlet for gas on the low-pressure side. The feed gas is conveyed into the inlet port, the retentate gas is conveyed from the retentate outlet port, and the permeate gas is conveyed from the permeate port.

The modules are equipped with semipermeable polymeric membranes exhibiting a CO₂/CH₄ gas separation factor above 25, preferably above 35, and most preferably above 45, as measured at room temperature. The membrane in stage one further exhibits a high oxygen/methane separation factor above 5, preferably above 7, and most preferably above 9 at room temperature. To enable nitrogen removal from the biogas, the polymeric membrane that exhibits a nitrogen/methane separation factor above 2, preferably above 2.7, is deployed. The gas separation efficiency is affected by the pressure ratio, i.e., the feed gas to the permeate gas pressure ratio. To maintain high separation efficiency, the permeate gas from the third membrane unit is collected at low pressure, i.e., at atmospheric or sub-atmospheric pressure. The pressure delivered to the third membrane separation unit can be further increased by the use of a booster.

The polymeric membranes exhibit high water vapor permeability combined with a high H₂O/CH₄ separation factor. The water vapor is removed by permeation, generating the RNG product that meets the pipeline specification.

It is further within the scope of the invention to deploy membranes with different separation characteristics in the first, second, and third membrane separation units. The first stage membrane separation unit can be configured to remove CO₂ and O₂ from the methane by utilizing a membrane with high CO₂/CH₄ and high O₂/CH₄ selectivity. The third stage membrane separation unit can be configured to concentrate O₂ in addition to methane and nitrogen in the retentate stream while removing carbon dioxide into the low-pressure permeate stream. The retentate stream is directed into the PSA unit for further purification. By configuring the third membrane unit with a membrane exhibiting CO₂/CH₄ selectivity above 50, a higher-purity carbon dioxide can be generated for independent use or sequestration.

The operating temperature in each membrane stage may be the same or different to optimize the overall separation efficiency. The gas may be preheated or cooled between stages to control the temperature. The RNG product pressure can be further boosted to meet the pipeline pressure specification.

The membrane productivity (permeance) and selectivity are a function of specific membrane selection as well as operating process conditions, such as temperature, and for some membrane materials, the separation efficiency can be further affected by the partial pressure of carbon dioxide in the feed. The optimal membrane area selection for each membrane separation stage is driven by membrane performance characteristics and process conditions as would be known to those skilled in the art. The membrane area for each membrane stage is optimized by the number of modules selected and arranged in parallel. A series arrangement is less favorable since it can increase the pressure drop through the unit.

The product purity with respect to carbon dioxide concentration is controlled primarily by valves positioned on the retentate lines of membrane separation units two and three and additionally by regulating membrane permeance through adjusting temperatures of the gas streams. The product purity is controlled by retentate valve settings that, in turn, control the stage cut. Namely, the ratio of the permeate gas volume to the feed gas volume—the stage cut, i.e., the fraction of the feed gas conveyed to the membrane permeate side wherein the impurities are removed. Thus, a valve position on the retentate line determines retentate product purity. A valve position on the retentate line of the second membrane separation unit controls the final carbon dioxide product purity by determining the permeate gas volume directed to recycle. A valve position on the retentate line of the third membrane separation unit determines the final carbon dioxide concentration of the permeate gas and the amount of gas volume directed to the PSA system for further treatment.

The retentate stream of the third membrane separation unit enriched in oxygen content is treated in the PSA unit, wherein the majority of oxygen and a fraction of nitrogen are removed. The oxygen and nitrogen are removed as a blow-off gas in the adsorbent regeneration step. A $CH_4$ analyzer can be used to prevent $CH_4$ slip with the removed $O_2$—$N_2$ mixture. Alternatively, the concentration of methane in the blow-off gas can be regulated so the blow-off gas can be used as a fuel gas for the facility energy needs. The methane and carbon dioxide gas mixture generated by the PSA unit is recycled to the front end of the compressor to increase $CH_4$ recovery. It is also within the scope of the invention to withdraw the $CH_4$-containing mixture from the PSA unit at sub-atmospheric pressure and compress the stream in a gas blower or a vacuum compressor to increase the PSA separation efficiency.

The biogas treated by the combination of the multi-stage membrane units integrated with the PSA adsorption system may still contain oxygen in excess of the product pipeline specification. Additional oxygen removal may be required to meet pipeline specifications. Oxygen removal can be further carried out utilizing a thermal or catalytic oxidizer (deoxo) unit. The fourth effluent stream is treated by catalytic combustion of oxygen utilizing the thermal oxidizer unit downstream of the second membrane unit followed by aftercooling, condensate removal, and gas dehydration in an additional gas dehydration unit.

It is also within the scope of the invention to remove oxygen from the second effluent stream by positioning the thermal catalytic oxidizer unit between the first and second membrane units. The thermal catalytic oxidizer unit downstream of the first membrane unit is followed by aftercooling and condensate removal. This embodiment can be advantageous since it does not require a separate dehydration step. The excess water vapor generated by the thermal oxidizer is removed by the second membrane unit.

The retentate process stream generated by the third membrane unit is treated by the PSA unit prior to recycling. The PSA unit removes most of the oxygen and some nitrogen to decrease their content in recycled gas, which allows for generating recoverable biomethane according to pipeline specification with respect to carbon dioxide and oxygen content. The recycle stream contains a nitrogen gas concentration below that of the raw feed gas stream. The PSA unit consists of multiple beds optimized for oxygen and nitrogen removal. The beds are equipped with an adsorbent selective to carbon dioxide and methane adsorption, and with lower sorption capacity towards nitrogen and oxygen as compared to that of methane. Activated carbon is among the preferred adsorbents. The third membrane separation unit removes water vapor in addition to carbon dioxide, generating the retentate stream with a low water vapor dew point. This aids carbon adsorption separation efficiency.

The PSA unit includes two or more adsorption columns filled with adsorbent and a system of switching valves. The system can further include auxiliary devices, such as check valves and throttling orifices. The minimum number of PSA beds is 2, which is necessary for continuous operation. Increasing the number of adsorbers reduces the unevenness of flows and in some cases increases recovery of the target component from the inlet gas mixture by increasing the number of pressure equalizations between the adsorbers (for a 2 adsorbent system, 1 pressure equalization exists, for a 4 adsorbent system, 2 pressure equalizations exist, etc.). The optimal number of beds depends on the initial content of the impurities in the feed that must be removed. If the concentration of impurities in the feed is low (primarily oxygen and nitrogen), the optimal number of beds in the majority of cases will be two. One equalization will provide the necessary degree of gas mixture separation; further equalizations can lead to undesirable contamination of upper adsorbent layers and upper product of the PSA by the desorbed $CH_4$. Four or more beds can be preferable when the initial content of the preferentially sorbed components is low or if the blow-off gas is utilized as a fuel and thus the methane slip in the blow-off gas does not lead to methane emissions.

The process of the invention wherein a low-pressure biogas gas containing acid gases $CO_2$ and $H_2S$, oxygen, and nitrogen is treated in a system that includes a compressor, a multistage membrane system, and a pressure swing adsorption unit is shown schematically in FIG. 1. The $H_2S$ is removed by an adsorption unit prior to or following compression before the raw feed biogas is introduced into membrane units. The multistage membrane system features two recycle streams designed to increase methane recovery. The pressure swing adsorption unit is positioned to treat one of the recycle streams to remove excess oxygen, and nitrogen from the recirculation loop.

With reference to FIG. 1, the raw feed biogas (101) is compressed in compressor (102) followed by aftercooling and condensate separation (not shown) forming the first effluent stream (103). The first effluent stream (103) is treated in the first membrane unit (104) that removes carbon dioxide, oxygen, and nitrogen thus forming a third permeate effluent stream (106) and the second retentate effluent stream (105) depleted in carbon dioxide, oxygen, and some fraction of nitrogen.

The second retentate effluent stream (105) is treated in the second membrane unit (107) that removes additional carbon dioxide, oxygen, and some fraction of nitrogen thus forming the fifth permeate effluent stream (111) and the fourth retentate effluent stream (110) collected as RNG product. The fifth permeate effluent stream (111) is collected at an atmospheric pressure or a sub-atmospheric pressure and is recycled to the front end of the compressor (102) to increase methane recovery. The fifth effluent stream (111) or a fraction of it can be used to regenerate the adsorption unit (126) positioned in front of the compressor (102) intake designed to remove hydrogen sulfide and other impurities. In some embodiments, a hydrogen sulfide removal unit (126) is positioned before compressor (102) feed gas intake and the fifth permeate effluent stream (111) is recycled to the front end of the adsorption unit and mixed with the raw biogas (101). In other embodiments of the invention, the fifth permeate effluent stream (111) is collected at atmospheric pressure, the pressure of the fifth effluent stream (111) is boosted to equal the pressure of a sixth effluent stream (115), and the fifth effluent stream (111) is combined with the sixth effluent stream (115) and the combined stream is directed into said pressure swing adsorption separation unit (114A, 114B). It is also within the scope of the invention, to collect the fifth effluent stream (111) at a pressure equal to the pressure of the sixth effluent stream (115); the fifth effluent stream (111) is mixed with the sixth effluent stream (115) and the combined stream is passed to said pressure swing adsorption separation unit (114A, 114B).

The third permeate effluent stream (106) is treated in the third membrane separation unit (108) to generate the seventh permeate effluent stream (112) comprised of carbon dioxide with a volumetric concentration above 90% and the sixth retentate effluent stream (115) enriched in methane, oxygen and nitrogen content. The seventh permeate effluent stream (112) is collected at an atmospheric or sub-atmospheric pressure. The seventh effluent stream (112) is removed at a sub-atmospheric pressure above 0.2 bara by way of a vacuum pump.

The product purity of RNG stream (110) is a function of the stage cut of the membrane unit two (107) which is controlled by the valve (109). The seventh effluent stream (112) carbon dioxide purity is a function of the stage cut of the membrane unit three (108) which is controlled by the valve (113).

The sixth retentate stream (115) is treated in the PSA unit comprised of two beds (114A and 114B). The PSA unit generates the methane and $CO_2$ eighth effluent stream (117) depleted of oxygen and nitrogen and the blow-off-reject ninth effluent stream (116) comprised primarily of oxygen and nitrogen. The operation of the PSA unit is controlled by valves (118, 119, 120, 121, 122, 123, 124, and 125).

The PSA bed arrangement and the gas treatment process are described for the 2-bed configuration with reference to FIG. 1. The retentate gas (115) generated by the membrane separation unit 3 (108) is treated by the 2-bed PSA system (114A, 114B). The inlet gas to the PSA system (114A, 114B) does not require additional filtration since the gas originated as a permeate from the first membrane unit. The feed gas under pressure that exceeds atmospheric pressure is treated by transporting the gas through the adsorbent bed in the adsorption columns that affect the removal of target impurities from the gas. The pressure in the column is altered between high-pressure and low-pressure cycles. The preferentially sorbed gas components are sorbed during the high-pressure cycle and desorbed during the low-pressure cycle. Activated carbon is commonly used as an adsorbent for $CO_2$ and $CH_4$ adsorption as its adsorption capacity increases in sequence: $O_2 < N_2 < CH_4 < CO_2$. Therefore, $CO_2$ and $CH_4$ during the high-pressure cycle are adsorbed preferentially to that of $N_2$ and $O_2$. This allows the attainment of an $N_2+O_2$ mixture in the upper part of the adsorber (blow-off gas or upper product) which is removed during the blow-off cycle. During the pressure reduction cycle that follows the blow-off stage, $CH_4$ and $CO_2$ are released from the adsorbent and sent for recycling to the front end of the compressor (102) to increase methane recovery. In some embodiments, wherein the feed carbon dioxide concentration in the raw biogas feed is high, a fraction of carbon dioxide is removed from the recycle stream. In this embodiment, the carbon dioxide is removed from the loop via a separate conduit. The initial fraction of the desorbed gas high in $CO_2$ content is desorbed and withdrawn from the loop through this additional conduit line. The removal of carbon dioxide is carried out to decrease energy demand otherwise required for gas re-pressurization. Vacuum evacuation of desorption products or absorbent rinsing by part of the upper product can be applied to intensify adsorbent regeneration thus increasing the dynamic adsorption capacity of the adsorbent. In some cases, all $N_2+O_2$ mixture in the upper part of the adsorber can be used for adsorbent rinsing if the gas mixture with desorption products is utilized as a fuel gas.

Operation of the PSA unit (114A, 114B) is carried out as follows. At any time, one of the valves (118) or (119) is opened to provide an unobstructed flow of the retentate gas (115) from the third membrane unit (108). The gas under elevated pressure is fed to one of the adsorbers (114A) or (114B) through one of the feed conduits controlled by valves (118) or (119). As the gas is treated in one of the adsorption beds (114A, 114B), the oxygen and nitrogen gas mixture with low $CH_4$ content is discharged from the second adsorber through one of the valves (122) or (123) and line (116). Alternatively, check valves may be applied instead of switching valves (122) and (123) with their auto opening when the pressure in a pressurized adsorber becomes higher than the pressure in line (116). At the same time, the other of the two adsorbers (114A) or (114B) is in desorption mode when previously adsorbed gases are released or evacuated through switch valves (120) and (121) for further recycling. Switching of adsorption and desorption modes includes the equalization phase, during which the upper and lower parts of adsorbers are connected by opened valves (124) and (125), and gas from an adsorber under elevated pressure flows to adsorber at lower pressure. Controlled opening of valves (124) and (125) or installation of throttling orifices can be applied to limit gas velocity during equalization. Valve (125) is not obligatory for installation and can be excluded because the connection of lower adsorber parts can be reached through simultaneously opened valves (118) and (119).

To improve the efficiency of the PSA process operation the eighth effluent stream (117) can be removed at a sub-atmospheric pressure from the adsorption bed by way of a vacuum pump prior to being conveyed to the compressor (102) intake. The improved efficiency can be via a decrease in recycled gas volume, an increase in the concentration of recovered gas components, or increase in the amount of impurities removed.

In some embodiments, the ninth effluent stream (116) is not vented but is utilized beneficially for heat or power generation. The caloric value of the ninth effluent stream (116) is adjusted using the system of valves to meet gas composition that meets the power generation specifications and thus the ninth effluent stream (116) is used for heat or power generation.

The system may further include $H_2S$ removal units. The $H_2S$ is removed by an adsorption unit (126) prior to or an adsorption unit (127) following compression before the raw feed biogas (102) is introduced into membrane units. The $H_2S$ removal unit (126) can be a biological $H_2S$ removal unit or an adsorption-based $H_2S$ removal unit. The system may further include an additional oxygen removal unit (128). The thermal oxidation oxygen removal unit (128) is shown positioned to treat the final product methane stream. In this case, the unit must be followed by a water removal unit (not shown). The thermal oxidation oxygen removal unit can be further positioned between the first membrane separation unit and the second membrane separation unit. The second membrane separation unit beneficially removes water vapor generated by the thermal oxidation unit eliminating the need for a separate dryer.

Figure 2:
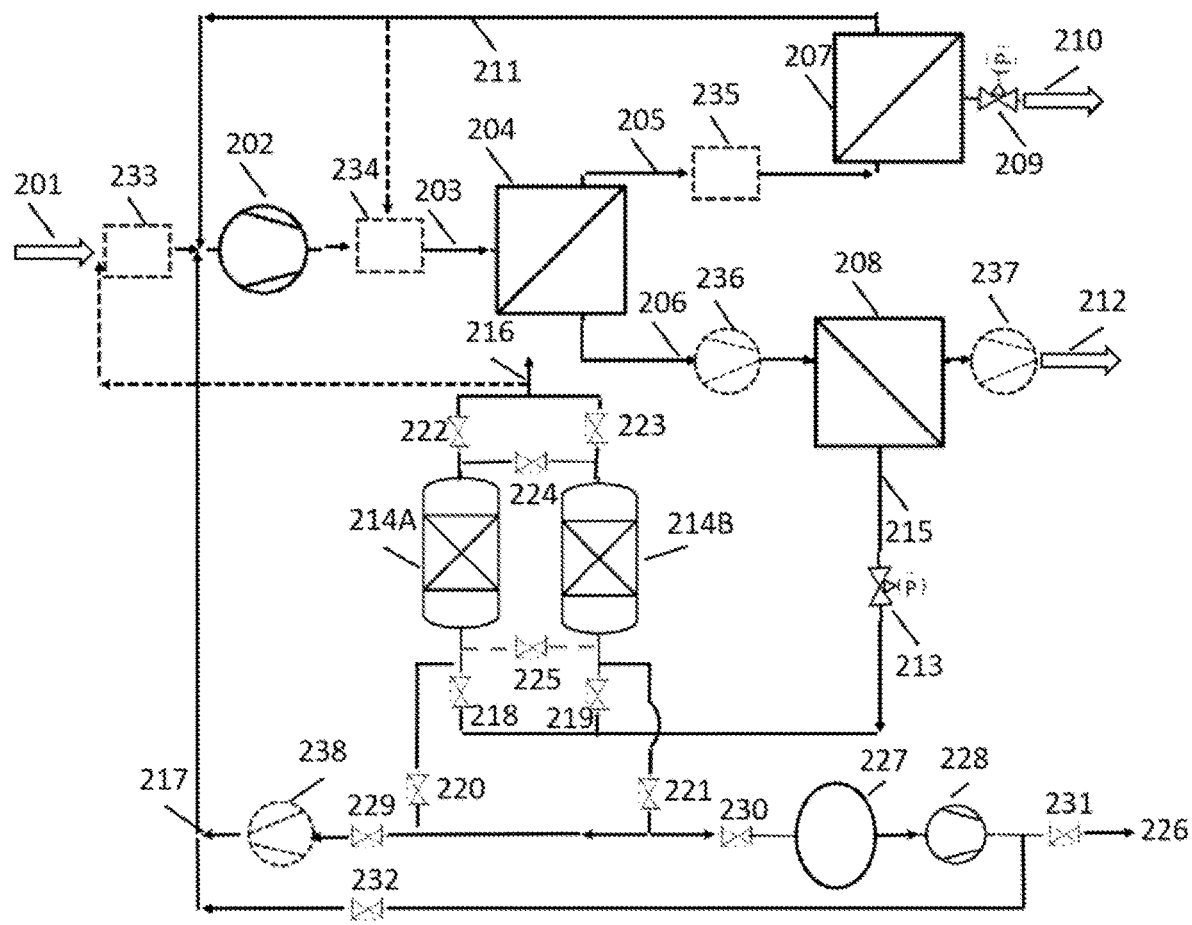
FIG. 2 is a schematic drawing of another exemplary embodiment of a process according to the invention wherein a low-pressure biogas gas containing acid gases $CO_2$ and $H_2S$, oxygen, and nitrogen is treated in a system comprised of a compressor, a multi-stage membrane unit and a pressure swing adsorption unit. The multistage membrane system features two recycle streams designed to increase methane recovery. The pressure swing adsorption unit is positioned to treat one of the recycle streams to remove oxygen and nitrogen from the recirculation loop. The oxygen and nitrogen are removed as a blow-off gas at above atmospheric pressure. The adsorption unit is further designed to remove additional carbon dioxide at sub-atmospheric pressure via a conduit connected to a vacuum pump. The hydrogen sulfide is removed prior to the high pressure gas entering the first membrane separation unit.

In another embodiment of the process of the invention, the raw biogas containing acid gases $CO_2$ and $H_2S$, oxygen, and nitrogen is treated in a system that includes a compressor, a multistage membrane system, and a pressure swing adsorption unit as shown schematically in FIG. 2. The $H_2S$ is removed prior to or following compression before the raw feed biogas is being introduced into membrane units. The multistage membrane system features two recycle streams designed to increase methane recovery. The pressure swing adsorption unit is positioned to treat one of the recycle streams to remove excess oxygen, and nitrogen from the recirculation loop.

With reference to FIG. 2, the raw feed biogas (201) is compressed in compressor (202) followed by aftercooling and condensate separation (not shown) forming the first effluent stream (203). The first effluent stream is treated in the first membrane unit (204) that removes carbon dioxide, oxygen, and nitrogen thus forming a third permeate effluent stream (206) and the second retentate effluent stream (205) depleted in carbon dioxide, oxygen, and some fraction of nitrogen.

The second retentate effluent stream (205) is treated in the second membrane unit (207) that removes additional carbon dioxide, oxygen, and some fraction of nitrogen thus forming the fifth permeate effluent stream (211) and the fourth retentate effluent stream (210) collected as RNG product. The fifth permeate effluent stream (211) is collected at atmospheric pressure. A fraction of the fifth effluent stream (211) can be optionally utilized for the adsorption unit (234) regeneration.

The third permeate effluent stream (206) is treated in the third membrane separation unit (208) to generate the seventh permeate effluent stream (212) comprised of carbon dioxide with a volumetric concentration above 90% and the sixth retentate effluent stream (215) enriched in carbon dioxide, oxygen and nitrogen content. The seventh permeate effluent stream (212) is collected at atmospheric or sub-atmospheric pressure. A vacuum pump (237) is optionally utilized to collect effluent stream (212) at sub-atmospheric pressure. It is also within the scope of the invention optionally to boost the pressure of the third effluent stream (206) via a compressor or booster (236).

The product purity of RNG stream (210) is a function of the stage cut of the membrane unit two (207) which is controlled by the valve (209). The seventh effluent stream (212) carbon dioxide purity is a function of the stage cut of the membrane unit three (208) which is controlled by the valve (213).

The sixth retentate stream (215) is treated in the PSA unit comprised of two beds (214A and 214B). The PSA unit generates the methane and $CO_2$ eighth effluent stream (217) depleted of oxygen and nitrogen and the blow-off-reject ninth effluent stream (216) comprised primarily of oxygen and nitrogen. The operation of the PSA unit is controlled by valves (218, 219, 220, 221,222, 223, 224, 225 and 229). Optionally the eighth effluent stream (217) is removed at sub-atmospheric pressure from the pressure swing adsorption separation unit by way of a vacuum pump (238) prior to being conveyed to the intake side of said compressor (202).

The PSA adsorption unit further features a conduit that allows the removal of a separate carbon dioxide tenth effluent stream (226) in the process of bed regeneration. The tenth effluent stream (226) is removed at an atmospheric or a sub-atmospheric pressure by way of a vacuum pump with an intake pressure above 0.2 bara. The conduit includes an isolation valve (230) followed by an accumulator (227), a vacuum pump (228) and an isolation valve (231). A bypass line with an isolation valve (232) allows for the recycling of the stream (226) to the front end of the compressor (202) during periods of time when $CH_4$ content after the vacuum pump (228) is substantial.

The system may further include $H_2S$ removal units. The $H_2S$ is removed by an adsorption unit (233) prior to compression or an adsorption unit (234) following compression before the raw feed biogas is introduced into membrane units. The $H_2S$ removal unit (233) can be a biological $H_2S$ removal unit or an adsorption-based $H_2S$ removal unit. The blow-off ninth effluent stream (216) or a fraction there off can be optionally utilized to increase the efficiency of the biological $H_2S$ removal unit (233). The system may further include an additional oxygen removal unit (235). The thermal oxidation oxygen removal unit (235) is positioned between the first membrane separation unit (204) and the second membrane separation unit (207). The second membrane separation unit beneficially removes water vapor generated by the thermal oxidation unit eliminating the need for a separate dryer. The thermal oxidation oxygen removal unit can be positioned to treat the final product methane stream. In this case, the unit must be followed by a water removal unit not shown.

Example

A raw biogas stream of the composition summarized in Table 1 is treated by the process of the invention to generate the renewable natural gas product.

TABLE 1

| | |
|---|---|
| Mole Fraction $CO_2$ | 0.39000 |
| Mole Fraction $H_2S$ | 0.00050 |
| Mole Fraction Ammonia | 0.00010 |
| Mole Fraction $N_2$ | 0.02000 |
| Mole Fraction $O_2$ | 0.00800 |
| Mole Fraction $CH_4$ | Balance |

The raw biogas with a volumetric flow of 1000 Nm3/hr, a temperature of 40° C. and a pressure of 0.0025 barg is compressed by way of a blower to 0.20 barg followed by aftercooling and condensate separation. The gas temperature is reduced to 24° C. and the gas is treated in an adsorption bed to remove hydrogen sulfide, wherein the hydrogen sulfide concentration is reduced to 0.000005 mole fraction.

The raw gas stream at 0.15 barg pressure is combined with recycle streams from the adsorption unit (eight effluent stream) and second membrane separation unit (fifth effluent stream) and directed to the intake of a compressor, wherein the raw feed gas is compressed to 13.0 barg followed by aftercooling and condensate separation. Ammonia is removed in the process below 1 ppm due to dissolution in condensed water. The compressed gas stream forms the first effluent stream with a volumetric flow of 1,424 Nm3/hr, a temperature of 24° C., and the gas composition as shown in Table 2.

TABLE 2

| | |
|---|---|
| Mole Fraction $CO_2$ | 0.4570 |
| Mole Fraction $H_2S$ | 0.000008 |
| Mole Fraction $N_2$ | 0.0273 |
| Mole Fraction $O_2$ | 0.0123 |
| Mole Fraction $CH_4$ | 50.2446 |
| Mole Fraction water vapor | Balance |

The first effluent stream is directed into the first membrane separation unit, wherein the membrane removes a portion of carbon dioxide gas, oxygen and nitrogen gases from the first effluent stream, thereby forming a second effluent stream having a lower carbon dioxide gas content and a lower oxygen content than the first effluent stream and a permeate third effluent gas stream enriched in carbon dioxide gas and oxygen as compared to first effluent stream. The volumetric flow of the second retentate effluent stream is 924 Nm3/hr, a temperature of 22° C., a pressure of 11.7 barg, and a gas composition shown in Table 3.

TABLE 3

| | |
|---|---|
| Mole Fraction $CO_2$ | 0.2425 |
| Mole Fraction $H_2S$ | 0.000005 |
| Mole Fraction $N_2$ | 0.03613 |
| Mole Fraction $O_2$ | 0.01027 |
| Mole Fraction $CH_4$ | 0.7185 |
| Mole Fraction water vapor | Balance 0.000219 |

The volumetric flow of the third permeate effluent stream is 499.6 Nm3/hr, at temperature of 23° C., at pressure of 2.98 barg, and gas composition as shown in Table 4.

TABLE 4

| | |
|---|---|
| Mole Fraction $CO_2$ | 0.8536 |
| Mole Fraction $H_2S$ | 0.000012 |
| Mole Fraction $N_2$ | 0.01101 |
| Mole Fraction $O_2$ | 0.01617 |
| Mole Fraction $CH_4$ | 0.1169 |
| Mole Fraction water vapor | Balance 0.002294 |

The second retentate effluent stream is treated in the second membrane separation unit to generate the fourth retentate stream and the fifth effluent permeate stream. The volumetric flow of the fourth retentate effluent stream is 513.6 Nm3/hr, a temperature of 18° C., a pressure of 11.3 barg, with a gas composition shown in Table 5.

TABLE 5

| | |
|---|---|
| Mole Fraction $CO_2$ | 0.01448 |
| Mole Fraction $H_2S$ | 0.000001 |
| Mole Fraction $N_2$ | 0.03216 |
| Mole Fraction $O_2$ | 0.002559 |
| Mole Fraction $CH_4$ | 0.9508 |
| Mole Fraction water vapor | Balance 0.000044 |

The fourth effluent stream constitutes the product RNG.

The volumetric flow of the fifth permeate effluent stream is 393.0 Nm3/hr, a temperature of 18° C., a pressure of 0.19 barg, with a gas composition shown in Table 6.

TABLE 6

| | |
|---|---|
| Mole Fraction $CO_2$ | 0.551 |
| Mole Fraction $H_2S$ | 0.000011 |
| Mole Fraction $N_2$ | 0.0415 |
| Mole Fraction $O_2$ | 0.02069 |
| Mole Fraction $CH_4$ | 0.383 |
| Mole Fraction water vapor | Balance 0.000456 |

The fifth effluent stream is recycled to the front intake of the compressor.

The third effluent stream is treated in the third membrane unit to generate the seventh permeate effluent stream and the sixth retentate effluent stream. The volumetric flow of the seventh permeate effluent stream is 393.0 Nm3/hr, a temperature of 19° C., a pressure of 0.09 barg, with a gas composition shown in Table 7.

TABLE 7

| | |
|---|---|
| Mole Fraction $CO_2$ | 0.971 |
| Mole Fraction $H_2S$ | 0.000011 |
| Mole Fraction $N_2$ | 0.00198 |
| Mole Fraction $O_2$ | 0.01239 |

TABLE 7-continued

| | |
|---|---|
| Mole Fraction $CH_4$ | 0.01375 |
| Mole Fraction water vapor | Balance 0.00291 |

The volumetric flow of the sixth retentate effluent stream is 106.3 Nm3/hr, a temperature of 20° C., a pressure of 2.8 barg, with a gas composition shown in Table 8.

TABLE 8

| | |
|---|---|
| Mole Fraction $CO_2$ | 0.507 |
| Mole Fraction $H_2S$ | 0.000014 |
| Mole Fraction $N_2$ | 0.04443 |
| Mole Fraction $O_2$ | 0.03016 |
| Mole Fraction $CH_4$ | 0.418 |
| Mole Fraction water vapor | Balance 0.000005 |

The sixth retentate effluent stream is treated in the adsorption gas separation unit to generate the ninth blow-off effluent stream and the eighth effluent stream containing recoverable methane. The volumetric flow of the eighth effluent stream is 102.3 Nm3/hr, with a temperature of 18° C., and a pressure of 0.18 barg, with a gas composition shown in Table 9.

TABLE 9

| | |
|---|---|
| Mole Fraction $CO_2$ | 0.4343 |
| Mole Fraction $H_2S$ | 0.000015 |
| Mole Fraction $N_2$ | 0.0254 |
| Mole Fraction $O_2$ | 0.0141 |
| Mole Fraction $CH_4$ | 0.526 |
| Mole Fraction water vapor | Balance 0.000005 |

The volumetric flow of the ninth blow-off effluent stream is 4.04 Nm3/hr, with a temperature of 40° C., and a pressure of 2.2 barg, with a gas composition shown in Table 10.

TABLE 10

| | |
|---|---|
| Mole Fraction $CO_2$ | 0.01004 |
| Mole Fraction $H_2S$ | 0.000004 |
| Mole Fraction $N_2$ | 0.5259 |
| Mole Fraction $O_2$ | 0.4363 |
| Mole Fraction $CH_4$ | 0.02668 |
| Mole Fraction water vapor | Balance 0.000004 |

The product RNG stream is generated with carbon dioxide and total inert gas concentrations that meet the pipeline specification.

The present invention is described with reference to Figures and a number of embodiments, which should not be construed as limiting the present invention.

What is claimed is:

1. A process for purification of a raw biogas stream comprised of methane, carbon dioxide, oxygen, nitrogen and hydrogen sulfide available at a substantially atmospheric pressure, said process comprising the steps of:
   (i) compressing a feed gas stream comprising said raw biogas stream in a compressor to a pressure from 6 to 25 barg, thereby forming a first effluent stream;
   (ii) passing the first effluent stream into a first membrane separation unit, wherein a membrane removes a portion of carbon dioxide, oxygen and nitrogen from the first effluent stream, thereby forming a retentate second effluent stream having a lower carbon dioxide content and a lower oxygen content than the first effluent stream and a permeate third effluent stream enriched in carbon dioxide and oxygen as compared to the first effluent stream;

(iii) passing the retentate second effluent stream to a second membrane separation unit, wherein a membrane removes a portion of carbon dioxide from the retentate second effluent stream, thereby forming a retentate fourth effluent stream having a lower carbon dioxide and oxygen content than the retentate second effluent stream and a permeate fifth effluent stream enriched in carbon dioxide and oxygen content as compared to the retentate second effluent stream;

(iv) passing the permeate third effluent stream to a third membrane separation unit wherein a membrane removes a portion of carbon dioxide from the permeate third effluent stream, thereby forming a retentate sixth effluent stream having a lower carbon dioxide content than the permeate third effluent stream and a higher oxygen and nitrogen content than the permeate third effluent stream and a permeate seventh effluent stream enriched in carbon dioxide content and depleted in oxygen, nitrogen and methane content as compared to the permeate third effluent stream, wherein the permeate seventh effluent stream is at substantially atmospheric pressure or at a sub-atmospheric pressure;

(v) passing the retentate sixth effluent stream to a pressure swing adsorption separation unit containing an adsorbent selective for removal of oxygen and nitrogen from a mixture of methane and carbon dioxide, wherein the pressure swing adsorption separation unit generates an eighth effluent stream depleted in nitrogen and oxygen content as compared to the retentate sixth effluent stream, and a blow-off gas ninth effluent stream comprised substantially of nitrogen and oxygen, wherein the eighth effluent stream is at an intake pressure of said compressor and the blow-off gas ninth effluent stream is at a pressure above atmospheric pressure;

(vi) passing the eighth effluent stream containing recoverable methane to an intake side of said compressor, wherein the eighth effluent stream is mixed with the raw biogas stream to define the feed gas stream;

(vii) passing the permeate fifth effluent stream containing recoverable methane to the intake side of said compressor, wherein the permeate fifth effluent stream is mixed with the raw biogas stream to define the feed gas stream; and (viii) collecting the retentate fourth effluent stream generated by the second membrane separation unit as a methane product.

2. The process of claim 1 wherein the eighth effluent stream contains a nitrogen concentration below a nitrogen concentration of the raw biogas stream.

3. The process of claim 1 wherein the feed gas stream is treated in a biological desulfurization unit prior to being compressed.

4. The process of claim 3 wherein the blow-off gas ninth effluent stream is mixed with the raw biogas stream to define the feed gas stream prior to treatment of the feed gas stream in the biological desulfurization unit.

5. The process of claim 1 wherein the membrane in the first, second and third membrane separation units is a polymeric membrane with a carbon dioxide/methane separation factor above 25.

6. The process of claim 5 wherein the membrane in the first, second and third membrane separation units is a polymeric membrane with a carbon dioxide/methane separation factor above 35.

7. The process of claim 6 wherein the membrane in the first, second and third membrane separation units is a polymeric membrane with a carbon dioxide/methane separation factor above 45.

8. The process of claim 5 wherein the membrane in the first, second and third membrane separation units is a polymeric membrane with an oxygen/methane separation factor above 5.

9. The process of claim 8 wherein the membrane in the first, second and third membrane separation units is a polymeric membrane with an oxygen/methane separation factor above 7.

10. The process of claim 9 wherein the membrane in the first, second and third membrane separation units is a polymeric membrane with an oxygen/methane separation factor above 9.

11. The process of claim 1 wherein the membrane in the third membrane separation unit is a polymeric membrane with a carbon dioxide/methane separation factor above 50.

12. The process of claim 8 wherein the membrane in the first, second and third membrane separation units is a polymeric membrane with a nitrogen/methane separation factor above 2.

13. The process of claim 12 wherein the membrane in the first, second and third membrane separation units is a polymeric membrane with a nitrogen/methane separation factor above 2.7.

14. The process of claim 1 wherein the membrane in each of the first, second and third membrane separation units is a polymeric membrane that possesses different gas separation characteristics as compared to one another.

15. The process of claim 1 wherein the retentate second effluent stream is treated in a deoxygenation unit prior to being passed to the second membrane separation unit.

16. The process of claim 1 wherein the retentate fourth effluent stream is treated in a deoxygenation unit prior to being collected as a methane product.

17. The process of claim 1 wherein a pressure booster or a second compressor is provided between the first and third membrane separation units.

18. The process of claim 1 wherein the feed gas stream is treated in an adsorption unit designed to remove hydrogen sulfide from the feed gas stream prior to the feed gas stream being passed to an intake side of said compressor.

19. The process of claim 18 wherein the permeate fifth effluent stream is recycled to an intake side of the adsorption unit and combined with the raw biogas stream to define the feed gas stream.

20. The process of claim 1 wherein an adsorption unit designed to remove hydrogen sulfide is positioned to treat the first effluent stream before the first effluent stream enters the first membrane separation unit.

21. The process of claim 20 wherein a portion of the permeate fifth effluent stream is used to regenerate the adsorption unit.

22. The process of claim 1 wherein said pressure swing adsorption separation unit comprises two to four adsorption beds.

23. The process of claim 1 wherein the permeate seventh effluent stream is collected at a sub-atmospheric pressure above 0.2 bara by way of a vacuum pump.

24. The process of claim 1 wherein the eighth effluent stream is removed at a sub-atmospheric pressure from the pressure swing adsorption separation unit by way of a vacuum pump prior to being conveyed to an intake side of said compressor.

25. The process of claim 1 wherein a caloric value of the blow-off gas ninth effluent stream is adjusted to meet a power generation specification and the blow-off gas ninth effluent stream is used for heat or power generation.

26. The process of claim 1 further comprising the step of:
(ix) collecting the permeate seventh effluent stream generated by the third membrane separation unit as a carbon dioxide product.

27. The process of claim 1 wherein the raw biogas stream is treated in a biological desulfurization unit.

28. An apparatus for purification of a raw biogas stream comprised of methane, carbon dioxide, oxygen, nitrogen and hydrogen sulfide available at a substantially atmospheric pressure, said apparatus comprising:
(i) a compressor that compresses a feed gas stream comprising said raw biogas stream to a pressure from 6 to 25 barg, thereby forming a first effluent stream;
(ii) a first membrane separation unit that receives the first effluent stream, the first membrane separation unit comprising a membrane that removes a portion of carbon dioxide, oxygen and nitrogen from the first effluent stream, thereby forming a retentate second effluent stream having a lower carbon dioxide content and a lower oxygen content than the first effluent stream and a permeate third effluent stream enriched in carbon dioxide and oxygen as compared to the first effluent stream;
(iii) a second membrane separation unit that receives the retentate second effluent stream, the second membrane separation unit comprising a membrane that removes a portion of carbon dioxide from the retentate second effluent stream, thereby forming a retentate fourth effluent stream having a lower carbon dioxide and oxygen content than the retentate second effluent stream and a permeate fifth effluent stream enriched in carbon dioxide and oxygen content as compared to the retentate second effluent stream;
(iv) a third membrane separation unit that receives the permeate third effluent stream, the third membrane separation unit comprising a membrane that removes a portion of carbon dioxide from the permeate third effluent stream, thereby forming a retentate sixth effluent stream having a lower carbon dioxide content than the permeate third effluent stream and a higher oxygen and nitrogen content than the permeate third effluent stream and a permeate seventh effluent stream enriched in carbon dioxide content and depleted in oxygen, nitrogen and methane content as compared to the permeate third effluent stream, wherein the permeate seventh effluent stream is at substantially atmospheric pressure or at a sub-atmospheric pressure;
(v) a pressure swing adsorption separation unit that receives the retentate sixth effluent stream, the pressure swing adsorption separation unit containing an adsorbent selective for removal of oxygen and nitrogen from a mixture of methane and carbon dioxide, wherein the pressure swing adsorption separation unit generates an eighth effluent stream depleted in nitrogen and oxygen content as compared to the retentate sixth effluent stream, and a blow-off gas ninth effluent stream comprised substantially of nitrogen and oxygen, wherein the eighth effluent stream is at an intake pressure of said compressor and the blow-off gas ninth effluent stream is at a pressure above atmospheric pressure;
(vi) wherein the eighth effluent stream containing recoverable methane is passed to an intake side of said compressor, wherein the eighth effluent stream is mixed with the raw biogas stream to define the feed gas stream;
(vii) wherein the permeate fifth effluent stream containing recoverable methane is passed to the intake side of said compressor, wherein the permeate fifth effluent stream is mixed with the raw biogas stream to define the feed gas stream; and
(viii) wherein the retentate fourth effluent stream generated by the second membrane separation unit is collected as a methane product.

29. The apparatus of claim 28 wherein the eighth effluent stream contains a nitrogen concentration below a nitrogen concentration of the raw biogas stream.

30. The apparatus of claim 28 further comprising a biological desulfurization unit that treats the feed gas stream prior to the feed gas stream being compressed.

31. The apparatus of claim 30 wherein the blow-off gas ninth effluent stream is mixed with the raw biogas stream to define the feed gas stream prior to treatment of the feed gas stream in the biological desulfurization unit.

32. The apparatus of claim 28 wherein the membrane in the first, second and third membrane separation units is a polymeric membrane with a carbon dioxide/methane separation factor above 25.

33. The apparatus of claim 32 wherein the membrane in the first, second and third membrane separation units is a polymeric membrane with a carbon dioxide/methane separation factor above 35.

34. The apparatus of claim 33 wherein the membrane in the first, second and third membrane separation units is a polymeric membrane with a carbon dioxide/methane separation factor above 45.

35. The apparatus of claim 32 wherein the membrane in the first, second and third membrane separation units is a polymeric membrane with an oxygen/methane separation factor above 5.

36. The apparatus of claim 35 wherein the membrane in the first, second and third membrane separation units is a polymeric membrane with an oxygen/methane separation factor above 7.

37. The apparatus of claim 36 wherein the membrane in the first, second and third membrane separation units is a polymeric membrane with an oxygen/methane separation factor above 9.

38. The apparatus of claim 28 wherein the membrane in the third membrane separation unit is a polymeric membrane with a carbon dioxide/methane separation factor above 50.

39. The apparatus of claim 35 wherein the membrane in the first, second and third membrane separation units is a polymeric membrane with a nitrogen/methane separation factor above 2.

40. The apparatus of claim 39 wherein the membrane in the first, second and third membrane separation units is a polymeric membrane with a nitrogen/methane separation factor above 2.7.

41. The apparatus of claim 28 wherein the membrane in each of the first, second and third membrane separation units is a polymeric membrane that possesses different gas separation characteristics as compared to one another.

42. The apparatus of claim 28 further comprising a deoxygenation unit that treats the retentate second effluent stream prior to being passed to the second membrane separation unit.

43. The apparatus of claim 28 further comprising a deoxygenation unit that treats the retentate fourth effluent stream prior to being collected as a methane product.

44. The apparatus of claim 28 further comprising a pressure booster or a second compressor disposed between the first and third membrane separation units.

45. The apparatus of claim 28 further comprising an adsorption unit that removes hydrogen sulfide from the feed gas stream prior to the feed gas stream being passed to an intake side of said compressor.

46. The apparatus of claim 45 wherein the permeate fifth effluent stream is recycled to an intake side of the adsorption unit and combined with the raw biogas stream to define the feed gas stream.

47. The apparatus of claim 28 further comprising an adsorption unit designed to remove hydrogen sulfide positioned to treat the first effluent stream before the first effluent stream enters the first membrane separation unit.

48. The apparatus of claim 47 wherein a portion of the permeate fifth effluent stream is used to regenerate the adsorption unit.

49. The apparatus of claim 28 wherein said pressure swing adsorption separation unit comprises two to four adsorption beds.

50. The apparatus of claim 28 further comprising a vacuum pump that collects the permeate seventh effluent stream at a sub-atmospheric pressure above 0.2 bara.

51. The apparatus of claim 28 further comprising a vacuum pump that removes the eighth effluent stream at a sub-atmospheric pressure from the pressure swing adsorption separation unit prior to being conveyed to an intake side of said compressor.

52. The apparatus of claim 28 wherein a caloric value of the blow-off gas ninth effluent stream is adjusted to meet a power generation specification and the blow-off gas ninth effluent stream is used for heat or power generation.

53. The apparatus of claim 28 wherein:
(ix) the permeate seventh effluent stream generated by the third membrane separation unit is collected as a carbon dioxide product.

54. The apparatus of claim 28 further comprising a biological desulfurization unit that treats the raw biogas stream.

* * * * *